(12) United States Patent
Walker et al.

(10) Patent No.: US 8,775,130 B2
(45) Date of Patent: Jul. 8, 2014

(54) SYSTEM FOR AUTOMATICALLY GENERATING PACKAGE DESIGNS AND CONCEPTS

(75) Inventors: John Oliver Walker, Rochester, NY (US); Barry Glynn Gombart, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 163 days.

(21) Appl. No.: 12/548,915

(22) Filed: Aug. 27, 2009

(65) Prior Publication Data

US 2011/0054849 A1  Mar. 3, 2011

(51) Int. Cl.
*G06F 17/50* (2006.01)

(52) U.S. Cl.
USPC ............................................................. 703/1

(58) Field of Classification Search
USPC ............................................................. 703/1
See application file for complete search history.

(56) References Cited

U.S. PATENT DOCUMENTS

| | | | |
|---|---|---|---|
| 3,902,655 A | 9/1975 | Huffman | |
| 5,235,519 A | 8/1993 | Miura | |
| 5,291,583 A | 3/1994 | Bapat | |
| 5,457,904 A | 10/1995 | Colvin | |
| 5,513,117 A | 4/1996 | Small | |
| 5,518,574 A | 5/1996 | Yates et al. | |
| 5,528,517 A | 6/1996 | Loken | |
| 5,687,087 A | 11/1997 | Taggart | |
| 5,768,142 A | 6/1998 | Jacobs | |
| 5,805,784 A | 9/1998 | Crawford | |
| 5,838,574 A | 11/1998 | Olson et al. | |
| 5,881,538 A | 3/1999 | Blohm | |
| 5,923,556 A | 7/1999 | Harris | |
| 6,005,959 A | 12/1999 | Mohan et al. | |
| 6,090,027 A | 7/2000 | Brinkman | |
| 6,092,054 A | 7/2000 | Tackbary et al. | |
| 6,117,061 A | 9/2000 | Popat et al. | |
| 6,134,018 A | 10/2000 | Dziesietnik et al. | |
| 6,153,039 A | 11/2000 | Jacobsen | |
| 6,237,787 B1 | 5/2001 | Gallo et al. | |
| 6,243,172 B1 | 6/2001 | Gauthier et al. | |
| 6,246,468 B1 | 6/2001 | Dimsdale | |
| 6,332,149 B1 | 12/2001 | Warmus et al. | |
| 6,409,019 B1 | 6/2002 | Hornsby et al. | |

(Continued)

FOREIGN PATENT DOCUMENTS

| | | |
|---|---|---|
| WO | WO 2005000681 A2 | 1/2005 |
| WO | WO 2005054983 A2 | 6/2005 |
| WO | WO 2005122079 A2 | 12/2005 |
| WO | WO 2007021920 A2 | 2/2007 |

OTHER PUBLICATIONS

Chen "A Knowledget Base System for Carton Package Design" GA2008, 11th Generative Art Conference Dec. 2008.*
BISG "Guidelines for Shipping Container Labeling" Jul. 2008.*

(Continued)

*Primary Examiner* — Saif Alhija
(74) *Attorney, Agent, or Firm* — Fox Rothschild LLP (57) ABSTRACT

A method and system for automatically generating a package design. Packaging information may be obtained. A processing module and a semantic knowledge base may automatically generate one or more graphical layout rules and one or more structural design rules based on the packaging information. A three dimensional representation of a package design may be automatically generated based on the one or more graphical layout rules and the one or more structural design rules. The three dimensional representation of the package design may be displayed.

19 Claims, 4 Drawing Sheets

(56) References Cited

U.S. PATENT DOCUMENTS

| | | | |
|---|---|---|---|
| 6,687,016 B2 | 2/2004 | Gauthier | |
| 6,689,035 B1 | 2/2004 | Gerber | |
| 6,771,387 B2 | 8/2004 | Gauthier | |
| 6,895,549 B1 | 5/2005 | Albright et al. | |
| 6,896,250 B2 | 5/2005 | Hillebrand | |
| 6,939,063 B2 | 9/2005 | Bussell | |
| 6,948,115 B2 | 9/2005 | Aizikowitz et al. | |
| 6,953,513 B1 | 10/2005 | Volkert | |
| 7,013,616 B1 | 3/2006 | Powers et al. | |
| 7,197,465 B1 | 3/2007 | Hu et al. | |
| 7,243,303 B2 | 7/2007 | Purvis et al. | |
| 7,293,652 B2 | 11/2007 | Learn et al. | |
| 7,327,362 B2 | 2/2008 | Grau | |
| 7,366,643 B2 * | 4/2008 | Verdura et al. | 703/1 |
| 7,406,194 B2 | 7/2008 | Aizikowitz et al. | |
| 7,647,752 B2 | 1/2010 | Magnell | |
| 7,765,469 B2 | 7/2010 | Sembower et al. | |
| 7,832,560 B2 | 11/2010 | Tilton | |
| 2002/0030854 A1 * | 3/2002 | Schutz et al. | 358/1.18 |
| 2002/0085001 A1 | 7/2002 | Taylor | |
| 2002/0118874 A1 | 8/2002 | Chung et al. | |
| 2003/0035138 A1 | 2/2003 | Schilling | |
| 2003/0083763 A1 | 5/2003 | Kiyohara et al. | |
| 2003/0091227 A1 | 5/2003 | Chang et al. | |
| 2003/0164875 A1 | 9/2003 | Myers | |
| 2003/0200111 A1 | 10/2003 | Damji | |
| 2004/0073407 A1 | 4/2004 | Nguyen et al. | |
| 2004/0120603 A1 | 6/2004 | Gupta | |
| 2005/0005261 A1 | 1/2005 | Severin | |
| 2005/0050052 A1 | 3/2005 | Zimmerman et al. | |
| 2005/0249400 A1 | 11/2005 | Fukumoto | |
| 2006/0080274 A1 | 4/2006 | Mourad | |
| 2006/0155561 A1 | 7/2006 | Harper | |
| 2006/0217831 A1 | 9/2006 | Butterworth et al. | |
| 2006/0284360 A1 | 12/2006 | Hume et al. | |
| 2007/0041035 A1 | 2/2007 | Sembower et al. | |
| 2007/0042885 A1 | 2/2007 | Rietjens et al. | |
| 2007/0112460 A1 | 5/2007 | Kiselik | |
| 2007/0172986 A1 | 7/2007 | Huang et al. | |
| 2008/0048308 A1 | 2/2008 | Lam | |
| 2008/0077415 A1 | 3/2008 | Shannon et al. | |
| 2008/0129035 A1 | 6/2008 | McDonald et al. | |
| 2008/0255945 A1 | 10/2008 | Percival et al. | |
| 2009/0063381 A1 | 3/2009 | Chan et al. | |
| 2009/0070213 A1 | 3/2009 | Miller et al. | |
| 2009/0236752 A1 | 9/2009 | Lee et al. | |
| 2009/0282782 A1 | 11/2009 | Walker et al. | |
| 2009/0287632 A1 | 11/2009 | Gombert et al. | |
| 2009/0287717 A1 | 11/2009 | Gombert et al. | |
| 2010/0060909 A1 | 3/2010 | Conescu et al. | |
| 2010/0098319 A1 | 4/2010 | Gombert et al. | |
| 2010/0110479 A1 | 5/2010 | Gombert et al. | |
| 2011/0054849 A1 | 3/2011 | Walker et al. | |

OTHER PUBLICATIONS http/www.esko.com/tmp/080606115325/G2558322_Kongsberg_tables_us_pdf.

Liang et al., "Folding Cartons with Fixtures: A Motion Planning Approach", IEEE Transactions on Robotics and Automation, Aug. 2000, vol. 16, No. 4.

Johnson K., "Automatic 3D Packaging Optimization Project", CTMA Symposium, Salt Lake City, Apr. 2, 2003.

* cited by examiner

SYSTEM FOR AUTOMATICALLY GENERATING PACKAGE DESIGNS AND CONCEPTS

BACKGROUND

The disclosed embodiments relate generally to methods and systems for automatically generating package designs and concepts.

In order to create a package, a package assembly typically requires multiple participants and resources. For example, a brand manager works with a structural designer to manually develop an appropriate structural design definition that meets specified requirements. The structural design definition must be compatible with the technical constraints arising from available production process equipment. The structural design definition is then forwarded to a packaging design agency to create graphics for use in the printing process.

Packaging design agencies spend a substantial amount of time creating samples and prototypes of packaging concepts for the brand owners. Typically, a package design process requires several iterations to arrive at an agreed-upon design for a package. The iterative process is often done in an ad hoc manner. This process can be very costly to brand owners because design agencies typically charge by the amount of time spent on a job. Numerous hours are spent creating samples and following up with the client only to go back to the drawing board. Often, the process can take weeks or months before arriving at a suitable design concept.

Once the structural and graphic designs are finalized, the graphic design is used to create a set of plates for the printing process, and the structural design is used in the creation of a compatible set of dies. The packaging flats are then printed, die-cut and converted to a form (e.g., ready to erect) that is compatible with the fulfillment process.

This process introduces the potential for errors due to the iterative nature of creating structural and graphic designs. Also, the process has long lead times and a slow turn around time which results in an extended product development cycle. Accordingly, the flexibility of creating new packages and graphics is limited. As such, it is time consuming and expensive to create sample packages and prototypes using the conventional process.

SUMMARY

In an embodiment, a computer program product may comprise a computer usable medium having a computer readable program code embodied therein. The computer readable program code may be adapted to be executed to implement a method for automatically generating a package design. Packaging information may be obtained. A processing module and a semantic knowledge base may automatically generate one or more graphical layout rules and one or more structural design rules based on the packaging information. A three dimensional representation of a package design may be automatically generated based on the one or more graphical layout rules and the one or more structural design rules. The three dimensional representation of the package design may be displayed.

In an embodiment, a system for automatically generating a packaging design may include a semantic knowledge base configured to maintain a plurality of package models and a processing module. The processing module may execute programming instructions that obtain packaging information, generate one or more graphical layout rules and one or more structural design rules based on the packaging information, and generate a three dimensional representation of a package design based on the one or more graphical layout rules and the one or more structural design rules.

BRIEF DESCRIPTION OF THE DRAWINGS

Aspects, features, benefits and advantages of the embodiments described herein will be apparent with regard to the following description, appended claims, and accompanying drawings where:

DETAILED DESCRIPTION

Before the present methods are described, it is to be understood that this invention is not limited to the particular systems, methodologies or protocols described, as these may vary. It is also to be understood that the terminology used herein is for the purpose of describing particular embodiments only, and is not intended to limit the scope of the present disclosure which will be limited only by the appended claims.

As used herein and in the appended claims, the singular forms "a," "an," and "the" include the plural reference unless the context clearly dictates otherwise. Thus, for example, reference to a "package" is a reference to one or more packages and equivalents thereof known to those skilled in the art, and so forth. Unless defined otherwise, all technical and scientific terms used herein have the same meanings as commonly understood by one of ordinary skill in the art. As used herein, the term "comprising" means "including, but not limited to."

A "computing device" is any processor-based device such as, for example, a server, a personal computer, a personal digital assistant, a web-enabled phone, a smart terminal, a dumb terminal and/or other electronic device capable of communicating in a networked environment. A computing device processes data to perform one or more functions. A computing device may interpret and execute instructions.

A "printing device" is an electronic device that is capable of receiving commands, and/or printing text characters, and/or images on a substrate. Printing devices may include, but are not limited to, network printers, production printers, copiers and other devices using ink or toner, and scanners. Printing devices may also perform a combination of functions such as printing/scanning, in which case such devices may be considered to be multifunctional devices.

An "assembly device" is a device used in an assembly line that performs an operation. For example, an assembly device may be used in a package construction process. For example, assembly devices may include a printing device and a die cutter. An assembly device may perform operations such as, but not limited to, printing, scanning, folding, sealing, creasing and/or perforating.

An "ontology" is a representation of concepts within a subject matter and the relationships between the concepts. An ontology is used for computational reasoning regarding the properties of the subject matter.

A "knowledge base" is an electronic repository of searchable data. A knowledge base may refer to a software component, such as, but not limited to, a database or a table. Alternatively, a knowledge base may refer to a hardware component, such as, but not limited to, a tangible storage medium. As discussed below, a semantic knowledge base includes data in the form of an ontology.

A "semantic reasoner" is a processing module used with a semantic knowledge base. The semantic reasoner is an application (such as a software application) that executes on the knowledge base which includes the ontology of a product (i.e. product descriptions) to generate a semantic structural design. Examples of a suitable semantic reasoner include, but are not limited to, a system such as Pellet, Racer, and Fact++.

Figure 1:
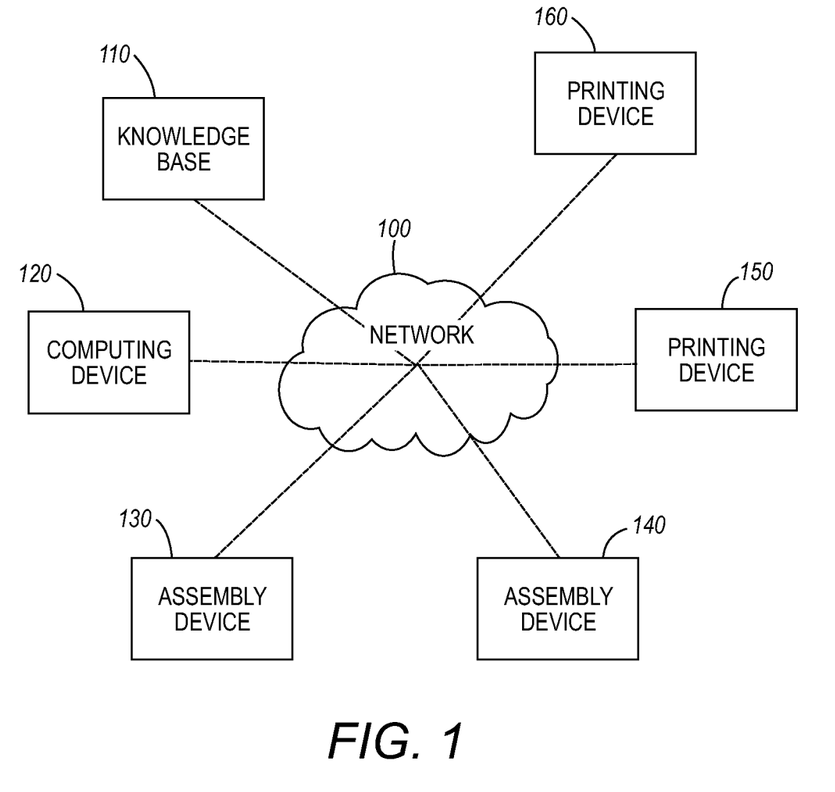
FIG. 1 illustrates a system for assembling a package according to an embodiment.

FIG. 1 illustrates a system for assembling a package according to an embodiment. As shown in FIG. 1, the system includes a knowledge base 110, a computing device 120, one or more assembly devices 130, 140, one or more printing devices 150, 160 and a network 100. A network 100 may include, but is not limited to, a local area network (LAN), a wide area network (WAN), the Internet, an intranet and/or any other communications network.

The knowledge base 110 may include data in the form of an ontology, such as web ontology language (OWL), which is endorsed by the World Wide Web Consortium, or another format that allows for the description of classes, attributes, individuals and associated relationships between various structural design constructs. The structural design constructs define individual objects of a class and provide attribute/value pairs for the individual objects and restrictions for certain classes. The class concept may be used to represent a group or set of individual objects with similar characteristics. Package design elements for folding cartons, such as panels, flaps and tabs, are examples of potential classes. Attributes may be used to associate individuals or design elements. For example, an attribute such as "hasPanel" might link an individual "Panel" to an individual "Sleeve." In an embodiment, individuals of a class may provide representations of physical and/or virtual aspects of a structural design.

The knowledge base 110 may communicate with a computing device 120, one or more assembly devices 130, 140 and one or more printing devices 150, 160. In an embodiment, the knowledge base 110 may be distributed across a plurality of devices including, but not limited to, the computing device 120, the assembly devices 130, 140 and the one or more printing devices 150, 160. In an embodiment, the knowledge base 110, or a portion thereof, may be contained within one or more of the assembly devices 130, 140, the computing device 120 and/or the one or more printing devices 150, 160. In such an embodiment, the knowledge base 110 may directly communicate with the computing device 120, the one or more assembly devices 130, 140 and/or the one or more printing devices 150, 160 in which it is contained instead of via the network 100.

Figure 2:
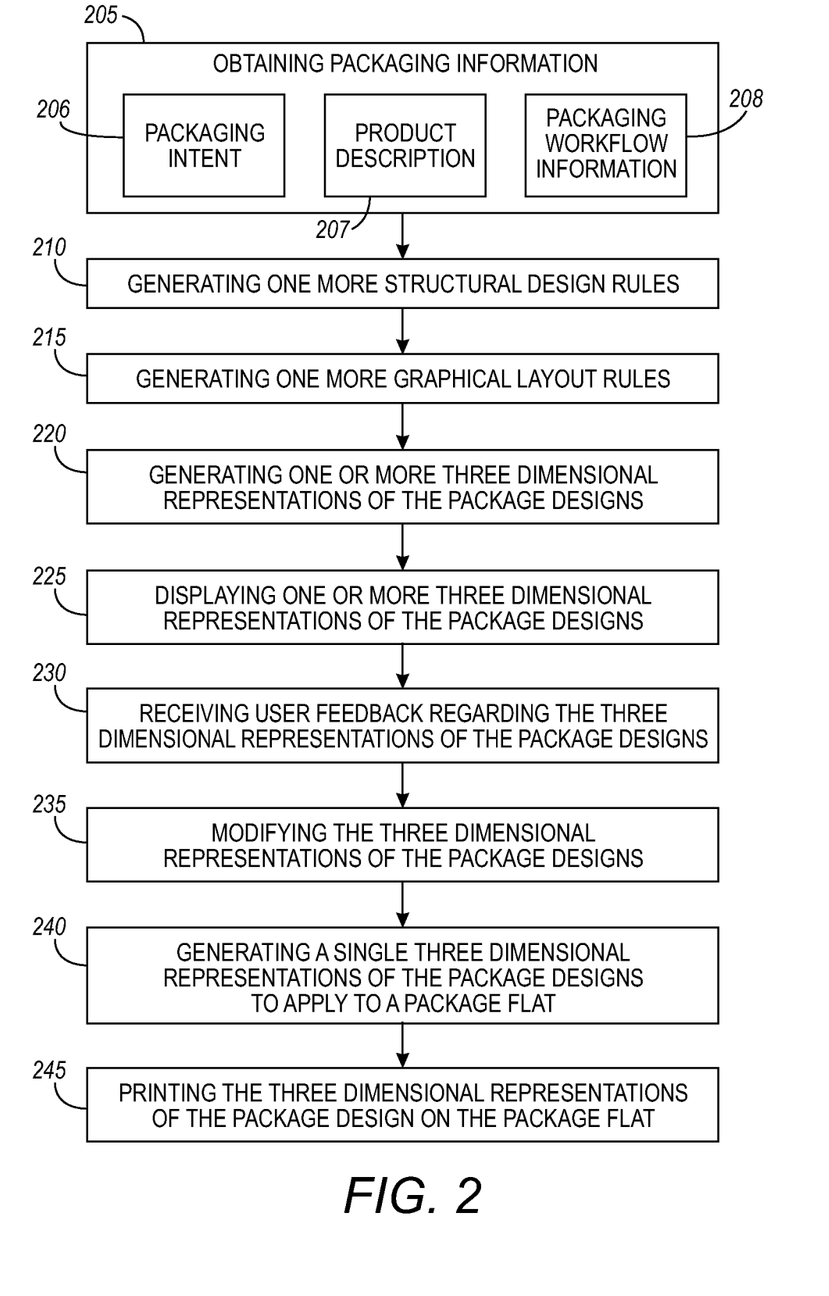
FIG. 2 discloses a method for automatically generating a packaging design according to an embodiment.

FIG. 2 discloses a method for automatically generating a packaging design according to an embodiment. In an embodiment, packaging information may be obtained 205 from a user of a computing device or a knowledge base. Packaging information may be used to provide constraints for the creation of a package design. Packaging information may include, but is not limited to, a packaging intent 206, a product description 207 and/or packaging workflow information 208.

A packaging intent 206 may include a description of the intended use, or functional or structural requirements, of a package or the container in which a product will be located. A packaging intent may include, but is not limited to, details about the structural constraints, industry constraints, layout guidelines and/or graphical design constraints. Structural constraints may include, but are not limited to, a required media strength, a thickness of paperboard with compensation for creases and tucks, and/or a design that can be manufactured and processed through a converting plant. Industry constraints may include, but are not limited to, federal, state and local government regulations and guidelines, which may include, but are not limited to, Food and Drug Administration (FDA) health and nutritional claims, Nutritional Labeling Education Act (NLEA), Tamper Evident Packaging, Federal Trade Commission (FTC) environmental and advertising claims, Fair Packaging and Labeling Act (FPLA), National Conference on Weights and Measures (NCWM), Environmental Protection Agency (EPA), Department of Commerce—National Institute of Standards and Technology (NIST), national trade and industry associations, international government organization layout guidelines, brand identification, instructions for product use, coding for quality assurance, expiration dates, and/or dietary and nutritional information. Layout guidelines include, but are not limited to, dimensional restrictions. For example, a layout guideline may be that the UPC Code may not be larger than a certain value. Graphical design constraints may include, but are not limited to, rules that guide the relationship between the graphical assets and/or rules that guide the layout of assets on the facets of the structural design. For example, a graphical design constraint may state that graphics may not be placed under a seal.

The product description 207 may include key aspects and/or features of the product. Key product features may include, but are not limited to, form constraints (i.e., solid, liquid, gel, etc.), fragility constraints, shape constraints, dimensional constraints, weight constraints, storage temperature constraints, humidity level constraints, vibration constraints, stress constraints, physical protection constraints and/or the application based constraints (i.e., consumer, commercial, etc.).

The packaging workflow information 208 may describe constraints of the package printing system, packaging line system, shipping system and/or warehousing system. Constraints related to packaging workflow information 208 may include the type of printing process, such as, but not limited to, litho, gravure, flexo and/or digital. In an embodiment, constraints related to the packaging workflow information 208 may be based on windowing, embossing and/or hot stamping. In an embodiment, the packaging workflow information 208 may be constrained by product filling/packing line. For example, the product filling/packing line may be constrained by the type of equipment, line speeds, feed, form, fill and close requirements (i.e., by hand and/or automated machinery), locking design and/or packaging line speed. The packaging workflow information 208 may be constrained based on the packaging line environment. The environment may include, but is not limited to, the temperature (i.e., hot, cold) and/or conditions (i.e., wet, humid or dry). In an embodiment, packaging workflow information 208 may be limited based on shipping requirements such as, but not limited to, specifications as to how the converter should pack, and/or mark and palletize the empty packages for shipment. In an embodiment, packaging workflow information 208 may be limited based on warehousing requirements, such as, but not limited to, proper package size for efficient handling on pallet and/or stability based on the abuse that the package will be subjected to before and after reaching a consumer.

A semantic reasoner may generate one or more structural design rules 210 and one or more graphical layout rules 215 based on the packaging information. The semantic reasoner may be used to infer logical consequences from a set of asserted facts specified by a packaging ontology. The semantic reasoner may be used with a knowledge base.

The knowledge base may include data in the form of an ontology that allows for the description of classes, attributes, individuals and associated relationships between various structural design constructs for packages. The ontology may be a description of the concepts and relationships that exist for the design domain (i.e. both structural and graphical designs) and workflow process of paperboard and corrugated packaging. The ontology also may include reasoning rules that support the processing of a packaging design domain knowledge base. The ontology may be used to create structural design rules and graphical layout rules.

One or more structural design rules 210 may be generated using a semantic structural design library. A semantic structural design library may include a set of semantic structural designs. Structural designs may include constraints and/or rules based on the capabilities of the structure in the semantic structural design library. The structural design rules 210 may be dynamic in that they can be used not only to create pre-defined packages, but also used to create new or non-pre-defined packages designed by a user of the system or based on the system. Optionally, as new packages are developed by users or by the system, the structural design rules may be updated to store the combination of rules used to create the new structures in the semantic structural design library.

A semantic structural design may be an intelligent representation that not only defines the structure in terms of "die lines" but retains information about the facets of a package. A "facet" is part of the structure of a package. For example, a facet may be a flap or side of the desired package. Facet information includes facet relationships, folding angles, folding dependencies, constraints and a three dimensional model. The semantic structural design may include one or more geometric shapes and facets used to assemble a package. Each flap, panel, edge and/or tab of the package may be a facet. Flap types may include, but are not limited to, a glue flap, a dust flap, a tuck flap, a male lock flap, a female lock flap and/or a bellow. Panel types may include, but are not limited to, an end panel, a top panel, a side panel, a charlotte, a flange, a cover panel, a front panel and/or a back panel. Edge types may include, but are not limited to, a cut, a crease, a perforation and/or an imaginary edge. Based on the facet information, one or more structural design rules 210 may be generated.

Figure 3:
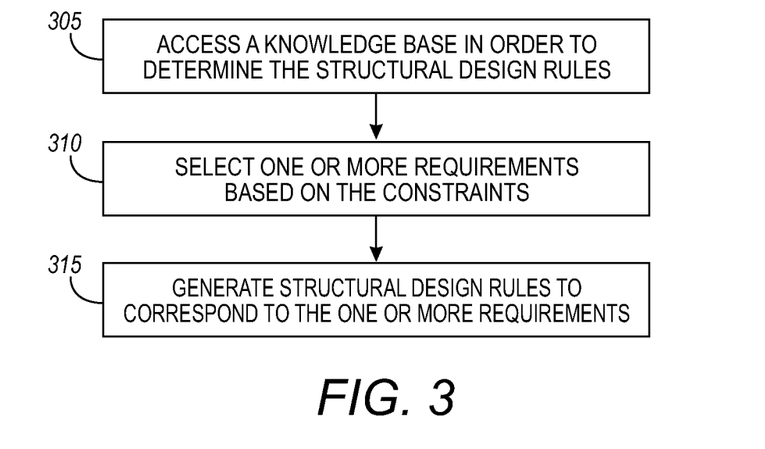
FIG. 3 discloses a flow diagram of an exemplary method for obtaining packaging information and generating rules based on the information according to an embodiment.

FIG. 3 discloses a flow diagram of an exemplary method for obtaining packaging information and generating structural design rules based on the information according to an embodiment. The packaging information, whether a packaging intent, a product description and/or packaging workflow information, may include a constraint. In order to generate structural design rules, a knowledge base may be accessed 305. One or more requirements located in the knowledge base may be selected 310 based on the constraints. Structural design rules may be generated 315 to correspond to the one or more requirements.

In an embodiment, a packaging intent may include a structural constraint. A knowledge base may be accessed 305 that includes one or more packaging requirements. One or more packaging requirements, such as the weight of the product to be packaged, may be selected 310 based on the structural constraint. Structural design rules may be generated 315 to correspond to the applicable weight. For example, if the packaging requirement is that the package must be able to carry a weight of 10 pounds. Then a rule will be selected which will limit the package designs to only those packages which can carry a weight of 10 or more pounds.

In an embodiment, a package dimension constraint may be provided as a product description. Applicable package dimensions may be selected from the knowledge base. Design rules may be created to correspond with the applicable package dimensions.

In an embodiment, a weight constraint may be provided and an applicable package thickness may be generated. In an embodiment, a fragility constraint may be provided and an applicable wrapping method may be generated. In an embodiment, a printing constraint may be provided and an applicable printing process may be generated. In an embodiment, a product filling constraint may be provided and an applicable speed may be generated. In an embodiment, a packaging line environment constraint may be provided and an applicable temperature may be generated. In an embodiment, a shipping method constraint may be provided and an applicable converter specification may be generated. In an embodiment, a warehousing constraint may be provided and an applicable package size may be generated.

Referring back to FIG. 2, using the semantic reasoner, one or more graphical layout rules may be generated 215 based on the packaging information. A graphical design template library may include a set of graphical design templates. A graphical design template can be used to create a graphical design based on a selected structural design.

A graphical design template may include one or more graphics. A graphic may include, but is not limited to, a shipping label, a logo, a symbol, a trademark and/or a design on one or more exterior surfaces of the package. Graphical layout rules may be created based on the graphic. For example, a graphical layout rule may state that a graphic on the front panel of the package may be no larger than a certain proportion of the size of the front panel. Alternatively, a graphical layout rule may include graphic placement restrictions so that, for example, the graphic does not cover a shipping label.

Figure 4:
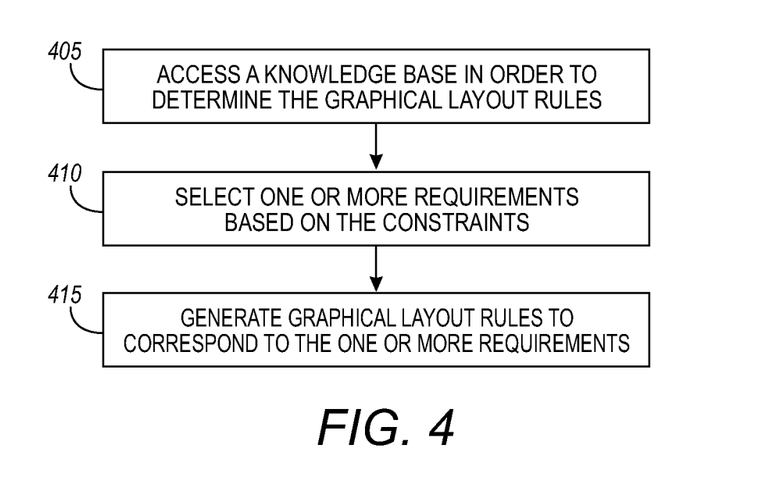
FIG. 4 discloses a flow diagram of an exemplary method for obtaining packaging information and generating graphical layout rules based on the information according to an embodiment.

FIG. 4 discloses a flow diagram of an exemplary method for obtaining packaging information and generating graphical layout rules based on the information according to an embodiment. The packaging information, whether a packaging intent, a product description and/or packaging workflow information, may include a constraint. In order to generate the graphical layout rules, a knowledge base may be accessed 405. One or more requirements located in the knowledge base may be selected 410 based on the constraints. Graphical layout rules may be generated 415 to correspond to the one or more requirements.

In an embodiment, an industry constraint may be used to generate a graphical layout rule. A knowledge base may be accessed 405 that includes one or more labeling requirements. An applicable labeling position and/or size based on the industry constraint may be generated 410 from the labeling requirements. Graphical layout rules may be generated 415 to correspond to the applicable labeling position and/or size.

In an embodiment, a graphical design constraint may be used to generate a graphical layout rule. A knowledge base may be accessed 405 that includes one or more facet design requirements. An applicable facet position and/or size based on the graphical design constraint may be generated 410 from the facet design requirements. Graphical layout rules may be generated 415 to correspond to the applicable facet position and/or size.

Referring back to FIG. 2, the structural design rules and the graphical layout rules may be applied to the packaging intent information to generate 220 a three dimensional representation of the package design. For example, if a fragility requirement, a product weight requirement and/or a product dimension requirement are received, then structural rules may be generated. For example, if there is a highly fragile product that weighs 3 pounds and is 5 inches by 5 inches by 3 inches, a three dimensional representation of a package may be created which includes bubble wrap on the inside of a 6 inch by 6 inch by 4 inch corrugated board.

In an embodiment, an automatic layout may be performed. A plurality of package designs may be created using the intents and rules. Referring to the example above, a second three dimensional package deign may be created which is a 5.5 inch by 5.5 inch by 3.5 inch package with popcorn inside die package to protect it from breaking during shipment. In an embodiment, generating 220 a three dimensional representation of a package design may include generating a location and boundaries for graphics based on industry constraints. For example, there may be a rule that no graphic can be placed where the mailing label will be located. Therefore, a graphic may be resized so that it does not interfere with the mailing address.

In an embodiment, the three dimensional representation of a package design may be displayed 225. The three dimensional representation of a package design may be presented to the user. In an embodiment, the three dimensional representation of a package design may be printed. In an embodiment, the results may be displayed via a monitor, a computer screen, a projector or another viewing device.

In an embodiment, the presentation of a three dimensional representation of a package design may be a dynamic process. The process may iterate by allowing the user to rank and/or order the resulting designs. In an embodiment, the system may receive 230 user feedback regarding the one or more displayed three dimensional representations. In an embodiment, the feedback may encompass user responses to questions. The user may answer the questions to create new user-oriented facts. In an embodiment, the questions created by the system may be dynamic. For example, the questions may evolve from iteration to iteration to guide the user to an ideal design. The displayed three dimensional representations may be modified 235 based on the feedback.

A single three dimensional representation of the package may be generated 240 to be applied to a package flat. The three dimensional representation of the package may be printed 245 on a package flat. As automatic layout is performed, at least some of the same data may be used in the generation of a package flat for printing as is used in the generation and presentation of a three dimensional representation. Using the generated three dimensional representation of a package design, a two dimensional representation or flat can be defined by remapping graphics such that when the flat is die cut and finished it is equivalent to the three dimensional representation. Prior package design systems define a package in two-dimensions and map the two-dimensional representation to three dimensions. Here, the process defining a package design in a way that allows for expression in either 3D or 2D. Through a more comprehensive expression of the design structure, graphics and their relationship, it is possible to quickly generate either a 3D or 2D representation of the design.

Figure 5:
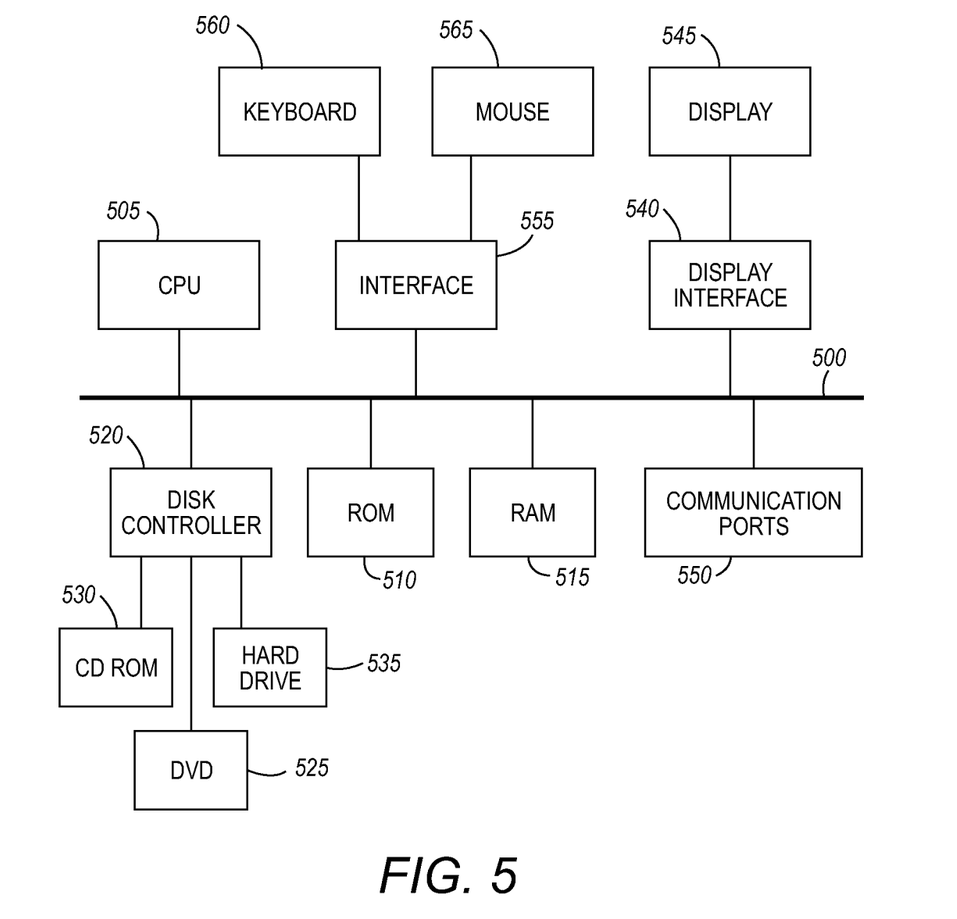
FIG. 5 depicts a block diagram of an exemplary system that may be used to contain or implement program instructions according to an embodiment.

FIG. 5 depicts a block diagram of an exemplary system that may be used to contain or implement program instructions according to an embodiment. Referring to FIG. 5, a bus 500 serves as the main information highway interconnecting the other illustrated components of the hardware. CPU 505 is the central processing unit of the system, executing program instructions and performing calculations and logic operations required to execute a program. Read only memory (ROM) 510 and random access memory (RAM) 515 constitute exemplary memory devices or storage media.

A disk controller 520 interfaces with one or more optional disk drives to the system bus 500. These disk drives may include, for example, external or internal DVD drives 525, CD ROM drives 530 or hard drives 535. As indicated previously, these various disk drives and disk controllers are optional devices.

Program instructions may be stored in the ROM 510 and/or the RAM 515. Optionally, program instructions may be stored on a computer readable storage medium, such as a hard drive, a compact disk, a digital disk, a memory or any other tangible recording medium.

An optional display interface 540 may permit information from the bus 500 to be displayed on the display 545 in audio, graphic or alphanumeric format. Communication with external devices may occur using various communication ports 550.

In addition to the standard computer-type components, the hardware may also include an interface 555 which allows for receipt of data from input devices such as a keyboard 560 or other input device 565 such as a mouse, remote control, touch pad or screen, pointer and/or joystick.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A computer program product, comprising a computer usable medium having a computer readable program code embodied therein, the computer readable program code adapted to be executed to implement a method for automatically generating a package design, the method comprising:
   receiving, from a user via an input device, a packaging intent comprising one or more constraints, wherein the one or more constraints comprise one or more of the following industry constraints:
   trade or industry association guidelines;
   brand identification guidelines;
   instructions for product use;
   coding for quality assurance;
   expiration dates; or
   dietary and nutritional information;
   automatically generating, with a processing module and a semantic knowledge base, one or more external graphical layout rules and one or more structural design rules based on the one or more constraints, wherein the external graphical layout rules are associated with a plurality of graphical assets and guide a relationship between a graphical asset and layout of each graphical asset on one or more exterior surfaces of the package;
   automatically generating a three dimensional representation of a package design based on the one or more external graphical layout rules and the one or more structural design rules, wherein automatically generating a three dimensional representation comprises, for at least one graphical asset of the plurality of graphical assets, determining an exterior surface location, on the three dimensional representation, associated with the at least one graphical asset and determining one or more boundaries associated with the at least one graphical asset based at least in part on the one or more industry constraints; and displaying the three dimensional representation of the package design, wherein displaying the three dimensional representation comprises displaying the at least one of the plurality of graphical assets at the determined exterior surface location and within the determined boundaries associated with the graphical asset.

2. The computer program product of claim 1 wherein the code is further adapted to implement a method comprising:
receiving user feedback regarding the displayed three dimensional representation of the package design; and
modifying the displayed three dimensional representation based on the user feedback.

3. The computer program product of claim 1 wherein said automatically generating one or more external graphical layout rules comprises:
accessing the semantic knowledge base to obtain one or more labeling requirements,
selecting from the one or more labeling requirements an applicable labeling position or size based on the industry constraint, and
causing the external graphical layout rules to correspond to the applicable labeling position or size.

4. The computer program product of claim 1 wherein:
the one or more constraints further comprise a structural constraint; and
said automatically generating one or more structural design rules comprises:
accessing the semantic knowledge base to obtain one or more packaging requirements,
selecting from the one or more packaging requirements an applicable dimension or weight based on the structural constraint, and
causing the structural design rules to correspond to the applicable dimension or weight.

5. The computer program product of claim 1 wherein:
the one or more constraints further comprise an external graphical design constraint; and
said automatically generating one or more external graphical layout rules comprises:
accessing the semantic knowledge base to obtain one or more facet design requirements,
selecting from the one or more facet design requirements an applicable facet position or size based on the external graphical design constraint, and
causing the external graphical layout rules to correspond to the applicable facet position or size.

6. The computer program product of claim 1 wherein:
the one or more constraints further comprise a package dimension constraint; and
said automatically generating one or more structural design rules comprises:
accessing the semantic knowledge base to obtain one or more structural requirements,
selecting from the one or more structural requirements an applicable package dimension based on the package dimension constraint, and
causing the structural design rules to correspond to the applicable package dimension.

7. The computer program product of claim 1 wherein:
the one or more constraints further comprise a weight constraint; and
said automatically generating one or more structural design rules comprises:
accessing the semantic knowledge base to obtain one or more structural requirements,
selecting from the one or more structural requirements an applicable package thickness based on the weight constraint, and
causing the structural design rules to correspond to the applicable package thickness.

8. The computer program product of claim 1 wherein:
the one or more constraints further comprise a fragility constraint; and
said automatically generating one or more structural design rules comprises:
accessing the semantic knowledge base to obtain one or more structural requirements,
selecting from the one or more structural requirements an applicable wrapping method based on the fragility constraint, and
causing the structural design rules to correspond to the applicable wrapping method.

9. The computer program product of claim 1 wherein:
the one or more constraints further comprise a printing constraint; and
said automatically generating one or more structural design rules comprises:
accessing the semantic knowledge base to obtain one or more structural requirements,
selecting from the one or more structural requirements an applicable print process based on the printing constraint, and
causing the structural design rules to correspond to the applicable print process.

10. The computer program product of claim 1 wherein:
the one or more constraints further comprise a product filling constraint; and
said automatically generating one or more structural design rules comprises:
accessing the semantic knowledge base to obtain one or more structural requirements,
selecting from the one or more structural requirements an applicable speed based on the product filling constraint, and
causing the structural design rules to correspond to the applicable speed.

11. The computer program product of claim 1 wherein:
the one or more constraints further comprise a packaging line environment constraint; and
said automatically generating one or more structural design rules comprises:
accessing the semantic knowledge base to obtain one or more structural requirements,
selecting from the one or more structural requirements an applicable temperature based on the packaging line environment constraint, and
causing the structural design rules to correspond to the applicable temperature.

12. The computer program product of claim 1 wherein:
the one or more constraints further comprise a shipping method constraint; and
said automatically generating structural design rules comprises:
accessing the semantic knowledge base to obtain one or more structural requirements, selecting from the one or more structural requirements an applicable converter specification based on the shipping method constraint, and causing the structural design rules to correspond to the applicable converter specification.

13. The computer program product of claim 1 wherein:

the one or more constraints further comprise a warehousing constraint; and said automatically generating one or more structural design rules comprises:

accessing the semantic knowledge base to obtain one or more structural requirements, selecting from the one or more structural requirements an applicable package size based on the warehousing constraint; and causing the structural design rules to correspond to the applicable package size.

14. The computer program product of claim 1 wherein the code is further adapted to implement a method comprising:

applying the three dimensional representation to print a package flat.

15. A system for automatically generating a package design, the system comprising:

a semantic knowledge base configured to maintain a plurality of package models; and a processing module that executes a group of program instructions for:

receiving, from a user via an input device, a packaging intent comprising one or more constraints, wherein the one or more constraints comprise one or more industry constraints, automatically generating one or more external graphical layout rules and one or more structural design rules based on the one or more constraints, wherein the external graphical layout rules are associated with a plurality of graphical assets and guide a relationship between a graphical asset and layout of each graphical asset on one or more exterior surfaces of the package, automatically generating a three dimensional representation of a package design based on the one or more external graphical layout rules and the one or more structural design rules, wherein automatically generating a three dimensional representation comprises, for at least one graphical asset of the plurality of graphical assets, determining an exterior surface location on the three dimensional representation associated with the at least one graphical asset and determining one or more boundaries associated with the at least one graphical asset based at least in part on the one or more industry constraints, displaying the three dimensional representation of the package design, wherein displaying the three dimensional representation comprises displaying the at least one graphical asset at the determined exterior surface location and within the determined boundaries associated with the at least one graphical asset; and remapping at least one graphic from the three dimensional representation to a two dimensional representation; and an assembly device configured to print a package flat by printing the two dimensional representation of the graphic on a substrate in accordance with the external graphical layout rules.

16. The system of claim 15 wherein the processing module also executes instructions for:

receiving user feedback regarding the displayed three dimensional representation of the package design, and automatically modifying the displayed three dimensional representation based on the user feedback.

17. The system of claim 15, further comprising:

a display device for displaying the three dimensional representation of the package design.

18. The system of claim 15, wherein the one or more industry constraints comprise trade or industry association guidelines.

19. The system of claim 15, wherein the one or more industry constraints comprise one or more of the following:

brand identification guidelines;

instructions for product use;

coding for quality assurance;

expiration dates; or dietary or nutritional information.

\* \* \* \* \*

UNITED STATES PATENT AND TRADEMARK OFFICE
CERTIFICATE OF CORRECTION

| | | |
|---|---|---|
| PATENT NO. | : 8,775,130 B2 | Page 1 of 1 |
| APPLICATION NO. | : 12/548915 | |
| DATED | : July 8, 2014 | |
| INVENTOR(S) | : John Oliver Walker et al. | |

It is certified that error appears in the above-identified patent and that said Letters Patent is hereby corrected as shown below:

On the Title Page

Item (75) Inventors

Change "Barry Glynn Gombart" to -- Barry Glynn Gombert --

Signed and Sealed this
Twenty-fifth Day of August, 2015

Michelle K. Lee
*Director of the United States Patent and Trademark Office*